United States Patent [19]

Gerner

[11] Patent Number: 5,376,479
[45] Date of Patent: Dec. 27, 1994

[54] LEAD-ACID BATTERY OF THE ABSORPTIVE MAT TYPE WITH IMPROVED HEAT TRANSFER

[75] Inventor: Scott D. Gerner, Brookfield, Wis.
[73] Assignee: Globe-Union Inc., Milwaukee, Wis.
[21] Appl. No.: 985,812
[22] Filed: Dec. 3, 1992
[51] Int. Cl.[5] .................. H01M 10/10; H01M 6/12
[52] U.S. Cl. ................................ 429/204; 429/120; 429/190
[58] Field of Search ................ 429/120, 190, 204

[56] References Cited

U.S. PATENT DOCUMENTS

| | | |
|---|---|---|
| 3,776,779 | 12/1973 | Johnson ........................ 136/151 |
| 3,930,881 | 1/1976 | Cestaro et al. ................. 136/26 |
| 4,317,872 | 3/1982 | Varma .......................... 429/190 |
| 4,414,302 | 11/1983 | Jache et al. ................... 429/190 |
| 5,035,966 | 7/1991 | Tokunaga et al. ............. 429/130 |
| 5,091,275 | 2/1992 | Brecht et al. .................. 429/247 |

Primary Examiner—David B. Springer
Attorney, Agent, or Firm—Foley & Lardner

[57] ABSTRACT

Absorption mat lead-acid batteries poorly dissipate heat from the internal components of the battery due to the air gap which exists between the plates and the inner wall of the container. Improved thermal management of the battery is achieved by filling the air gap, an insulating gap, with a thermally conductive gel, such as a gel formed of fumed silica and sulfuric acid electrolyte.

5 Claims, 1 Drawing Sheet

LEAD-ACID BATTERY OF THE ABSORPTIVE MAT TYPE WITH IMPROVED HEAT TRANSFER

BACKGROUND OF THE INVENTION

1. Field of the Invention

The present invention relates generally to the art of lead-acid batteries, and more particularly to lead-acid batteries of the absorptive mat variety. More specifically, the present invention relates to improved thermal management of such batteries.

2. Description of the Prior Art

Sealed lead-acid batteries in which oxygen gas generated at the positive electrode during charging of the battery is absorbed by the negative electrode have previously been known in two general categories. One is a retainer type and the other is a gel type. Both are generally considered to be of the acid-starved variety. This specification relates to batteries of the former type, in which a separator (typically a mat separator) is inserted between the positive and negative plates to isolate the electrodes and to retain the acid electrolyte. Sealed lead-acid batteries utilizing a gel, typically made from sulfuric acid electrolyte and a gelling agent, offer an alternative, but typically gelled systems are inferior discharge capacity. Examples of such batteries are shown in U.S. Pat. No. 3,776,779, issued Dec. 4, 1973 to Johnson for "Gelled Battery Electrolyte Containing a Polyglycol Polymer and a Process for Locating Same Within a Lead-Acid Cell"; U.S. Pat. No. 5,035,966, issued Jul. 30, 1991 to Tokunaga, et al. and entitled "Sealed Lead-Acid Battery"; U.S. Pat. No. 3,930,881, issued Jan. 6, 1976 to Cestaro, et al. and entitled "Immobilized Battery Electrolyte"; and U.S. Pat. No. 4,414,302, issued Nov. 8, 1983 to Jache, et al. and entitled "Method of Making a Lead Storage Battery and Lead Storage Battery Made According to this Method." This group of patents relates primarily to techniques for improving the gel used in such systems or the performance of the battery resulting therefrom.

In the mat systems described to this point, a space will exist around the periphery of the electrode/separator bundle, just inside the inner wall of the container. Such space is an air space and is hence insulating. It has been found in recent work that high internal temperatures generated during battery use tend to deteriorate battery performance over time. Thermal management is therefore highly desirable. It would be desirable in such absorptive mat systems to dissipate heat from the battery electrode/separator elements to prolong battery life and efficiency.

Several glass mat batteries known in the art are represented, for example, by U.S. Pat. No. 5,091,275, issued Feb. 25, 1992, to Brecht, et al. for "Glass Fiber Separator and Method of Making." This patent will be described here by way of background. The particular invention disclosed in this patent is a particular mat which includes micro-fibers and a binder, the latter including an aqueous mixture of colloidal silica particles and a sulfate salt. When the liquid electrolyte is added to this battery, it is wholly absorbed into the elements.

As discussed in this patent, lead-acid batteries typically include a plurality of electrode plates with separators disposed between electrode pairs to prevent metallic deposits in the battery from forming short circuits. Typically, the separators are porous so that electrolyte is absorbed therein to permit current to pass from one plate to another.

The patent also discloses the reactions which take place at the positive electrode, namely the hydrolysis of water, producing oxygen. Oxygen can react with the lead of the negative electrode to produce lead oxide, which is thereafter reduced to metallic lead, liberating the oxygen which then reforms water. Oxygen recombination, as is known, is limited by the rate of oxygen transport from the positive electrode to the negative electrode. The patent goes on to point out that certain silica materials establish desirable oxygen concentration gradients that drive the transport of oxygen along silica chains from the positive to the negative electrodes. Prior to the invention discussed in this patent, absorptive glass mat separators had been known, but complex equipment was needed for placing and compressing a separator between the electrodes. This patent describes one particular operation in which the absorptive glass mat can be handled in a rigid, compressed state and will expand with the addition of battery electrolyte to provide the desired separator-electrode plate contact. The way in which this is done is to mix a sulfate salt with colloidal silica to produce a dried mat material which can then be more easily handled during battery assembly. The colloidal silica used in this patent has a particle size ranging from 4–80 millimicrons. It is contemplated, however, that other forms of silica particles might be used, such as fumed or precipitated silica.

Another patent which involves the use of silica in battery construction is U.S. Pat. No. 4,317,872, issued Mar. 2, 1982 to Varma, entitled "Lead-Acid Battery with Gel Electrolyte". In this device, the electrolyte includes a silica component which is absorbed into the glass mat, the mat being made from micro fiber. Gelled electrolytes had been used in prior systems to eliminate spilling and the need for constant maintenance. Unfortunately, most prior gel systems did not have good electrical properties and the cycling characteristics did not compare well with batteries using liquid electrolytes. According to the patent, the gel could crack, allowing air to carry oxygen to the plates or electrodes of the battery, thereby allowing a quicker self-discharge than is desirable. This patent is directed to the combination of the glass mat technology previously described and gel technology, in which a gel electrolyte including silica components is employed. The separator material includes a silicate component integrally mixed with an oxygen compound of boron, forming a microfiber mat having a pore size between about 0.5–10 microns. In the preferred form, the separator material is in contact with and substantially envelops at least one of the electrodes. The patent discloses the use of precipitated silica, a finer silica typically having a very small particle size. When this material is combined with the other components of the electrolyte, it is absorbed into the separator.

SUMMARY OF THE INVENTION

The present invention features an absorptive mat lead-acid battery in which the pores of the mat are filled with a suitable electrolyte mixture, such as mixtures previously known from the patents referred to above or from the technical literature. The present invention also features the removal, to the extent it is already not removed, of the electrolyte solution or gel from the space surrounding the sides and bottom of the electrode, and thereafter adding a gel to such space. The present invention further features a mat separator type battery in which the void surrounding the electrodes on the sides and/or bottom is filled with a thermally conductive gel to assist in the dissipation of heat from the electrode elements, thereby increasing battery longevity.

In its most preferred form, a fumed silica is mixed with sulfuric acid electrolyte and is used to fill the void surrounding battery plates. In its very most preferred form, the surrounding gel comprises 5.3 wt. % silica in sulfuric acid electrolyte having a specific gravity of 1.28. Other features of the invention will become apparent to those skilled in the art after the present invention is read and understood. The ways in which the features of the invention are accomplished will be further appreciated by reference to the following detailed description of a preferred embodiment and by a review of the FIGURES annexed thereto.

DESCRIPTION OF THE DRAWINGS

In the various FIGURES, like reference numerals are used to indicate like components.

DETAILED DESCRIPTION OF THE PREFERRED EMBODIMENT

Figure 1:
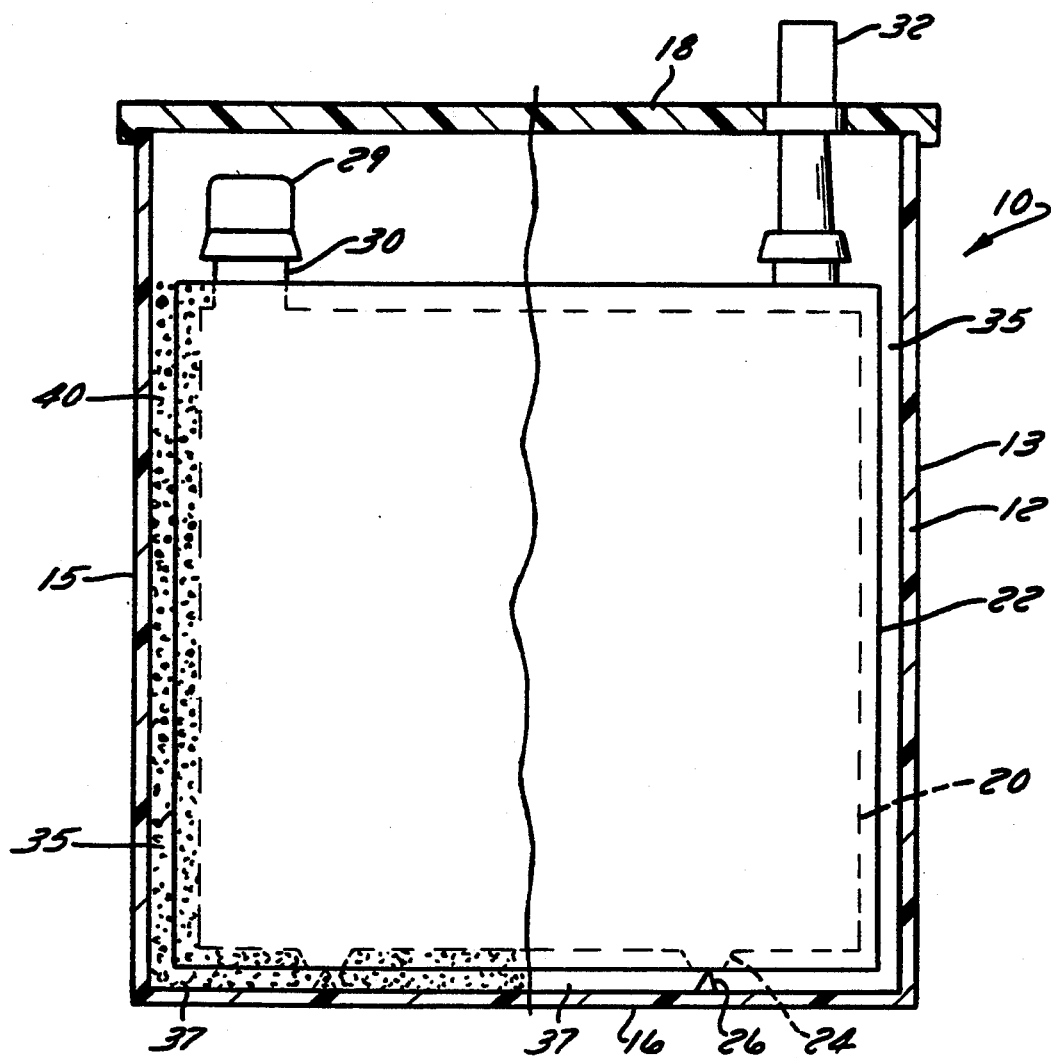
FIG. 1 is a schematic cut-away side view of a absorptive mat battery, showing on the left side the addition of gel in accordance with the teachings of the present invention, and showing on the right side the battery as it would exist in a normal prior art system.

Before proceeding to a detailed description of the preferred embodiment of the present invention, several general comments are warranted with regard to the applicability and the scope hereof. First, there are a wide variety of constructions of absorptive mat or retainer battery systems disclosed in the patent literature and in the technical literature. The term "mat" as used herein is meant to include glass fiber mats, mats prepared from a mixture of glass and polymeric fibers and other mats known in this art for use in absorption battery construction. These should be contrasted with the immobilized electrolyte systems which are also of the oxygen recombination battery type. Accordingly, schematic illustrations are used to describe the preferred embodiment of the invention, and the number of plates or cells used in a particular battery arrangement is not, in and of itself, relevant to the principles with which this invention is concerned. Furthermore, the type of end use for the batteries is not itself relevant, as batteries could be used for mobile or stationary purposes. Finally, while specific materials are suggested for use in preparing the surrounding gel, substitutions could be made therefor, provided such substitutions yield an overall thermal conductivity suitable for heat dissipation, as will become apparent shortly. Obviously, any material substituted for those which have been previously used with lead-acid battery constructions should also be selected from the class of materials which will not interfere with the normal electrochemical reactions occurring in such systems and from materials which would not degrade or in any other manner injure the plates, the separators, the battery casing and the like.

Dealing next with the types of materials which are useful for the filling or surrounding gel, I prefer to use sulfuric acid electrolyte, generally one having a specific gravity in the range of 1.215 to 1.350. In my most preferred embodiment, sulfuric acid electrolyte having a specific gravity of 1.280 is employed.

Silica is my preferred gelling material, and silica is commercially found in two main types. Precipitated silica has been employed previously with sulfuric acid for use in absorptive glass mat systems (and may be used in this invention), but precipitated silica typically has a particle size in the 4-80 micron range, a size which is capable of being totally absorbed in the separator. On the other hand, I prefer to use fumed silica which, in its most readily available form, has a particle size of about 200 microns. Such size is larger than the pores of the mats commonly used in modern mat recombinant batteries and would not be absorbed into the pores of the mat. The amount of silica can also vary. The preferred range is 3-8% silica, and in my most preferred embodiment, I use 5.3 wt. % with the aforementioned sulfuric acid electrolyte.

At least two methods can be employed for adding the silica and sulfuric acid electrolyte, one being to combine the materials before it is injected into the battery, and the other being to fill the battery with liquid electrolyte, remove the excess and fill voids with gelled electrolyte. In our preferred manufacturing technique, the materials are mixed and added at the same time and the gel allowed to set after forming of the battery. We have also noted that after forming, residual liquid will pool around the electrodes over the gel, and we prefer to remove it and backfill with the same gelled acid as used in the original injection step.

Proceeding next to a description of FIG. 1, a schematic representation is employed to compare the construction of the preferred embodiment of the present invention with a typical prior art absorptive mat battery. The center line extending vertically through the drawing separates the half representing the prior art from the half representing this invention. Those battery components themselves which will be described exist in both embodiments, and it will be obvious to those skilled in the art that the terminal could be shown on the left as opposed to the right-hand side of the drawing. In addition, the particular arrangement of the terminals, collector lugs, and the plate configurations are merely illustrative. In FIG. 1, a battery 10 is shown to include a case 12 having side walls 13 and 15, a bottom 16 and a cover 18.

Located within the casing are a plurality of battery plates, generally designated at 20, separated from plates of opposite polarity by separators 22. Plates 20 may include small feet 24 which, together with a ridge 26 on the bottom of the casing 12, support the plates from the bottom by a small distance. When a plurality of plates are coupled together, plates of like polarity are joined by a strap 29 connecting lugs 30. In end compartments or, for each cell if there is only a single compartment, terminal(s) 32 are provided. In the illustrated embodiment, the terminal extends through the cover 18.

A typical absorptive mat, e.g. an absorptive glass mat battery will include a space 35 between the side of the plates 20 and separator 22 and the side wall of the battery case, as is illustrated on the right side of the drawing. In addition, a second space 37 will exist between the bottom of the plates 20 and separators 22, as is illustrated at 37 in FIG. 1.

My modification made to the prior art is shown on the left side of FIG. 1, where a gel 40 is inserted in the space defined by reference numerals 35 and 37 on the right side. It will be noted that the gel fills the side space as well as the space beneath the plates and separators. Also, as previously mentioned, additional gelling material can be added after the battery is formed.

Figure 2:
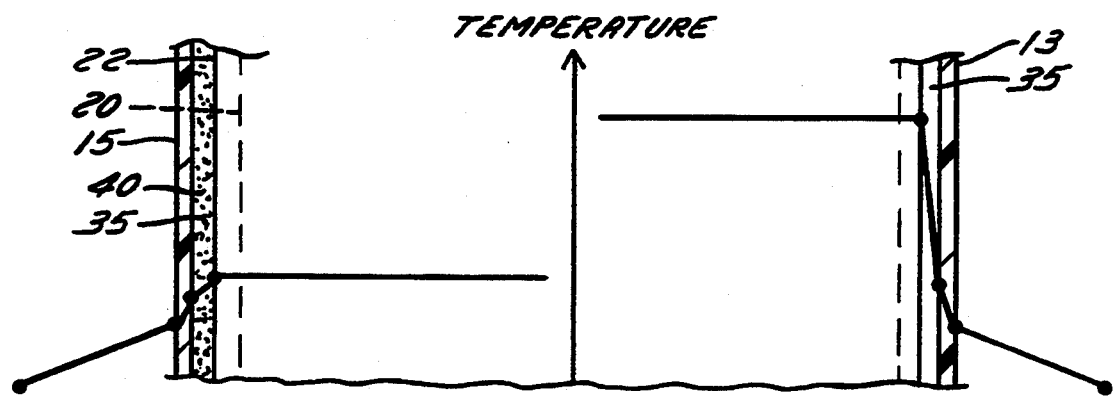
FIG. 2 is a schematic illustration of the temperature profile existing in the battery of FIG. 1, showing on the left side the temperature profile which exists when the principles of the present invention are employed, and showing on the right side the temperature profile which would exist without the gel and illustrating the higher internal battery temperature when the gel is not employed.

Referring next to FIG. 2, a temperature profile is provided in schematic form using a portion of the cross-section described in FIG. 1. The lugs, straps, terminals and the bottom of the battery have been eliminated, but the partial side view will serve to illustrate the advantages of the present invention. As will be seen by comparing the left and rights sides, again representing this invention and the prior art, respectively, it will be noted that the temperature generated during operation of the battery when the gel 40 is employed is substantially lower than the temperature which exists on the right-hand side when the heat generated by the electrochemical reactions in the battery system is insulated by space 35 from the battery casing. In our testing to date, we have found that the internal temperature can be reduced from 4° F. to 6° F. for a battery operating in a trickle charge condition at 120° F. Such reduced temperatures result in increased battery lifetime.

A wide variety of modifications can be made using the principles of the present invention. For example, if the mat system involves a plurality of individual cells with cell dividers, the gel would preferably be added to each compartment. It is also possible to vary the manufacturing technique, depending upon the clearance between the walls and the edges of the plates and separators, e.g. the closer the fit, the thinner the viscosity of the injected material to completely fill the void. Total filling of the void, however, is not required, as any points of contact between the gel and the plates and separators on the one hand, and the casing on the other, will result in heat transfer and maintenance of the internal battery temperatures at a temperature closer to ambient.

Several other modifications will appear to those skilled in this art after reading and understanding the present invention. Such other modifications and ways for achieving the features of the invention are deemed to fall within the scope of the invention if they fall within the scope of the claims which are appended hereto.

What is claimed is:

1. A lead-acid battery of the absorptive mat variety in which mats are located between electrode plates, the plates and mats being contained in a housing and in which a sulfuric acid electrolyte composition is absorbed in the mat to permit oxygen flow therethrough, the improvement comprising:
   a thermally conductive sulfuric acid-silica gel located in the area between the plates and mats and the housing, the gel including about 92–97 wt. % sulfuric acid having a specific gravity of between about 1.215 and 1.350 and about 3–8 wt. % of fumed silica.

2. The battery of claim 1, wherein the silica has an average particle size of about 200 microns.

3. The battery of claim 1, wherein the gel comprises about 5.3 wt. % fumed silica and about 94.7 wt. % sulfuric acid electrolyte having a specific gravity of 1.280.

4. The battery of claim 1, wherein the electrolyte composition is a gelled sulfuric acid electrolyte absorbed in the mat.

5. The battery of claim 4, wherein the gelling agent is silica and wherein the particle size thereof is less than the pore size of the mat.

* * * * *